United States Patent [19]

Cha

[11] Patent Number: 5,362,451
[45] Date of Patent: Nov. 8, 1994

[54] PROCESS AND REACTOR FOR CHAR-GAS OXIDE REACTIONS BY RADIOFREQUENCY CATALYSIS

[76] Inventor: Chang Y. Cha, 3807 Reynolds St., Laramie, Wyo. 82070

[21] Appl. No.: 105,097

[22] Filed: Aug. 11, 1993

Related U.S. Application Data

[60] Division of Ser. No. 895,962, Jun. 9, 1992, Pat. No. 5,269,892, which is a continuation-in-part of Ser. No. 670,842, Mar. 18, 1991, Pat. No. 5,246,554.

[51] Int. Cl.$^5$ ............................ B01D 53/32; C02F 1/32
[52] U.S. Cl. ..................................... 422/186.3; 422/24
[58] Field of Search ........................... 422/186.3, 24

[56] References Cited

U.S. PATENT DOCUMENTS

| | | | |
|---|---|---|---|
| 3,502,427 | 3/1970 | Johswich | 23/2 |
| 3,565,777 | 2/1971 | Lauer | 204/157.1 |
| 3,656,441 | 4/1972 | Grey et al. | 110/8 R |
| 3,765,153 | 10/1973 | Grey | 55/118 |
| 3,869,362 | 3/1975 | Machi et al. | 204/157.1 R |
| 3,887,683 | 6/1975 | Abe et al. | 423/235 |
| 3,960,682 | 6/1976 | Baranova et al. | 204/157.1 H |
| 3,981,815 | 9/1976 | Taniguchi et al. | 252/182 |
| 3,983,021 | 9/1976 | Henis | 204/164 |
| 3,997,415 | 12/1976 | Machi et al. | 204/157.1 H |
| 4,004,995 | 1/1977 | Machi et al. | 204/157.1 H |
| 4,076,606 | 2/1978 | Suzuki et al. | 204/157.1 R |
| 4,076,607 | 2/1978 | Zavitsanos et al. | 204/162 R |
| 4,175,016 | 11/1979 | Lewis et al. | 204/157.1 H |
| 4,671,952 | 6/1987 | Masse | 423/539 |

*Primary Examiner*—Donald P. Walsh
*Assistant Examiner*—Daniel Jenkins
*Attorney, Agent, or Firm*—John O. Mingle

[57] ABSTRACT

This process and reactor for char-gas oxide reactions utilizes radiofrequency catalysis to enhance desirable chemical reactions between carbon and such gas oxides. Removal of selected oxide constituents from a gas stream is a typical application.

8 Claims, 2 Drawing Sheets

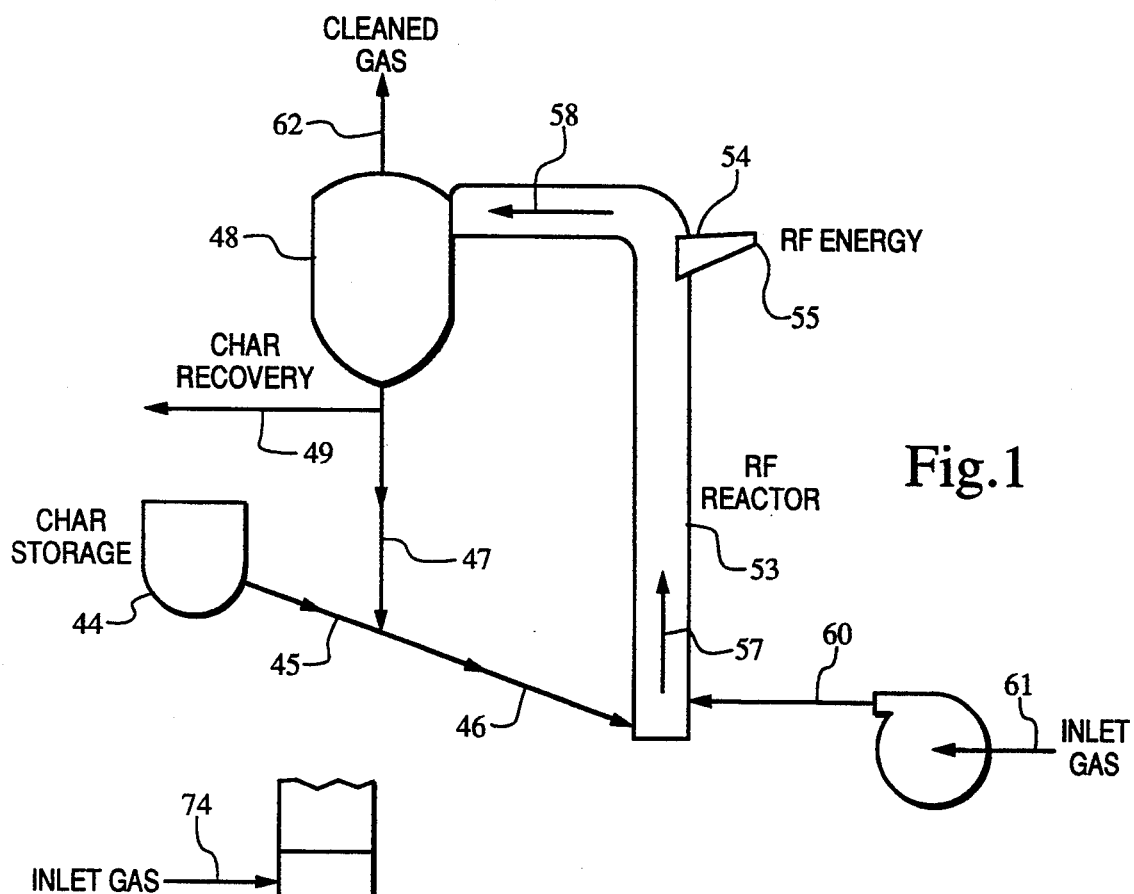
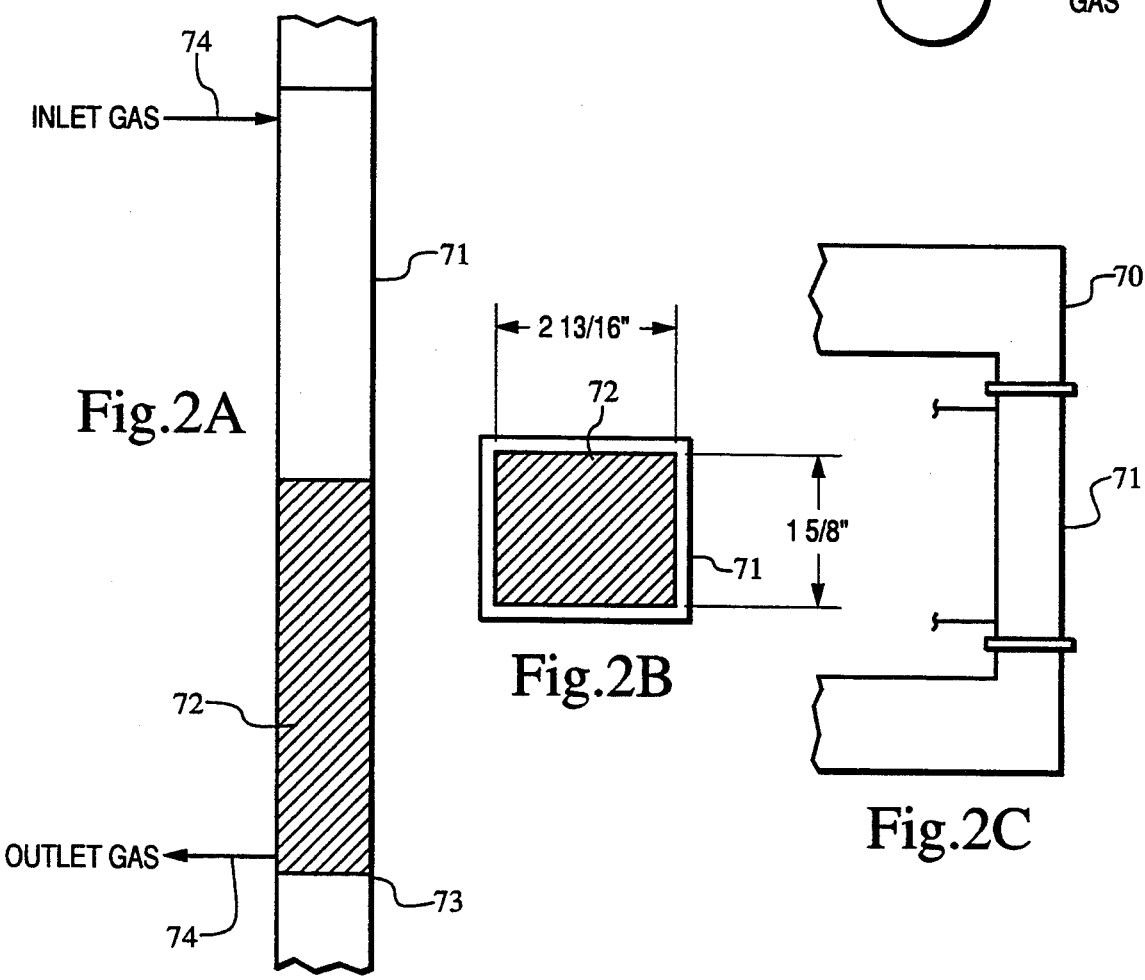

PROCESS AND REACTOR FOR CHAR-GAS OXIDE REACTIONS BY RADIOFREQUENCY CATALYSIS

This application is a divisional of application Ser. No. 07/895.962, filed Jun. 9, 1992, now U.S. Pat. No. 5,269,892; which itself is a continuation-in-part of application Ser. No. 07/670,842, filed Mar. 18, 1991, now U.S. Pat. No. 5,246,554.

BACKGROUND OF INVENTION

1. Field of Invention

The present invention relates to a process and its associated equipment for using electromagnetic energy in the radiofrequency region to catalyze selective chemical reactions involving gas oxides and char whose specification is hereby incorporated by reference.

2. Background

Many major industrial operations produce selected gases, often in the form of oxides, that contain valuable constituents as well as being environmentally restricted. Chemically reacting these oxides requires much energy, since the heats of reaction are often high, and this reduces the incentive to economically recover such constituents.

Coal is a major energy resource of the United States and must be utilized in increased amounts if energy independence is potentially a viable goal. A major problem associated with coal combustion is the resulting emissions of sulfur dioxide ($SO_2$) and nitrogen oxides ($NO_x$) into the atmosphere. Current flue gas removal technologies are not only expensive and cumbersome, but also produce troublesome waste products. High volumes of chemicals currently are required for $SO_2$ removal while $NO_x$ removal often uses expensive platinum catalysts. High conversions remain a difficult goal for these current technologies for the convenient chemical reactions require high activation energies, and thus, high temperatures.

Quantum radiofrequency (RF) physics is based upon the phenomenon of resonant interaction with matter of electromagnetic radiation in the microwave and RF regions, since every atom or molecule can absorb, and thus radiate, electromagnetic waves of various wavelengths. The detection of the radiated spectrum to determine the energy levels of the specific atoms or molecules is called radiofrequency spectroscopy. Often the so called "fine lines" are of interest, and these are created by the rotational and vibrational modes of the electrons. For instance, refer to L. Stepin, *Quantum Radio Frequency Physics*, MIT Press, 1965.

In the subject invention, the inverse is of interest, that is the absorption of microwave and RF wavelengths by the energy bands of the atoms or molecules resulting in a heating of the nonplasma material and the excitation of valence electrons. This lowers the activation energy required for desirable chemical reactions. In this sense, RF energy can be thought of as a form of catalysis when applied to chemical reaction rates. For instance, refer to Kirk-Othmer, *Encyclopedia of Chemical Technology*, 3rd Edition, Volume 15, pages 494-517, Microwave Technology.

The electromagnetic frequency spectrum is conveniently divided into ultrasonic, microwave, and optical regions. The microwave region runs from 300 MHz (megahertz) to 300 Ghz (gigahertz) and encompasses frequencies used for much communication equipment. The book by N. Cook, *Microwave Principles and Systems*, Prentice-Hall, 1986, is hereby incorporated by reference. A narrow part of this microwave region, 915 to 5000 MHz, is commonly employed for selective heating purposes. Microwave ovens are a common household item and operate normally using 2450 MHz, which is a good frequency for exciting water molecules. Because many vibrational energies are involved from a series of molecules for many applications involving mixtures, the actual radiofrequency energy employed is not critical, from a frequency viewpoint, thus the total practical range of from 915 to 5000 MHz is equally effective in catalyzing chemical reactions of mixtures. For instance, refer to Kirk-Othmer, *Encyclopedia of Chemical Technology*, 3rd Edition, Volume 15, pages 494-517, Microwave Technology. Yet because of cost many commercial as well as industrial microwave heating units operate at 2450 MHz, and this frequency is normally employed.

This type of microwave heating often goes by the common name "RF Heating" and is actually a misnomer for most actual radiofrequencies lie in the what is now called the ultrasonic region. This concept of using the symbol RF to indicate a catalytic heating action for chemical reactions, regardless of the actual frequencies employed, is common.

Much energy related research was performed in the decade of the 1970s, and a number of United States patents were issued. These and others include:

| No. | Inventor | Year |
|---|---|---|
| 3,502,427 | Johswich | 1970 |
| 3,565,777 | Lauer | 1971 |
| 3,656,441 | Grey-1 | 1972 |
| 3,765,153 | Grey-2 | 1973 |
| 3,869,362 | Machi-1 | 1975 |
| 3,887,683 | Abe | 1975 |
| 3,960,682 | Baranova | 1976 |
| 3,981,815 | Taniguchi | 1976 |
| 3,997,415 | Machi-2 | 1976 |
| 4,004,995 | Machi-3 | 1977 |
| 4,076,606 | Suzuki | 1978 |
| 4,175,016 | Lewis | 1979 |
| 4,435,374 | Helm | 1984 |
| 4,940,405 | Kelley | 1990 |

Referring to the above list, Johswich discloses an acid treated activated carbon, giving a higher porosity, for use in removing sulfur, sulfur oxides and nitrogen oxides from flue gases. Lauer discloses a process to decompose sulfur dioxide by first electrically charging water used for absorption and then exposing to an ultraviolet light catalyst to enhance sulfur formation. Grey-1 discloses a cyclone wall-film wash for flue gas components that is enhanced by an electrostatic corona discharge. Grey-2 discloses equipment for an electrostatic ionizing process within a cyclone system that removes flue gas components.

Machi-1 discloses a process for removing $SO_2$ and $NO_x$ by employing ionizing radiation or ultraviolet light at specific compositions to enhance their decomposition. Abe discloses a process for the removal of nitrogen oxides by injecting ammonia and absorbing on activated charcoal with a vanadium oxide catalyst. Baranova discloses a process for handling waste gas containing sulphurous-acid anhydride using an inorganic manganese salt as catalyst. Taniguchi discloses a process for removing sulfur dioxide and nitrogen dioxides by using ionizing radiation to form a removable aerosol.

Machi-2 discloses an improvement over Machi-1 by employing contaminated air as part of the process. Machi-3 discloses an improvement over Machi-1 by employing high dose rate electron beam irradiation. Suzuki discloses a process for decomposing $NO_x$ using microwave irradiation in the presence of normal exhaust gas constituents, such as $SO_2$, $CO_2$, in a typical homogenous decomposition. Lewis discloses a radiolytic-chemical process for gas production employing nitrogen oxides to inhibit secondary reactions.

Helm discloses a high temperature process employing superheated steam with carbon and microwave irradiation to produce water gas. Kelley discloses a two stage furnace pulsed combustor where the first combustor forms soot that is employed to reduce $SO_2$ and $NO_x$ in the second combustor where calcium is added to react with the sulfur.

Microwave heating was employed in other activities. For instance, Wall et.al. retorted oil shale with a standard microwave source in "Retorting Oil Shale by Microwave Power," 183 Advances in Chemistry Series 329, American Chemical Society, 1979.

SUMMARY OF INVENTION

The present invention catalyzes with RF microwave heating the chemical reaction of gases and pyrolytic carbon or char.

The objectives of the present invention include overcoming the above-mentioned deficiencies in the prior art and providing a potentially economically viable process for the chemical reaction of gases containing oxides and char.

The subject invention utilizes radiofrequency catalysis to enhance desirable chemical reactions between char and $NO_x$, $SO_2$, and $N_2O$ resulting in their elemental breakdown.

BRIEF DESCRIPTION OF THE DRAWINGS

FIG. 1 shows the flow diagram for RF catalyzed char-gas oxide reactions.

FIGS. 2A, 2B, and 2C show a char reactor incorporated within a RF wave guide.

DETAILED DESCRIPTION OF INVENTION

Figure 3:
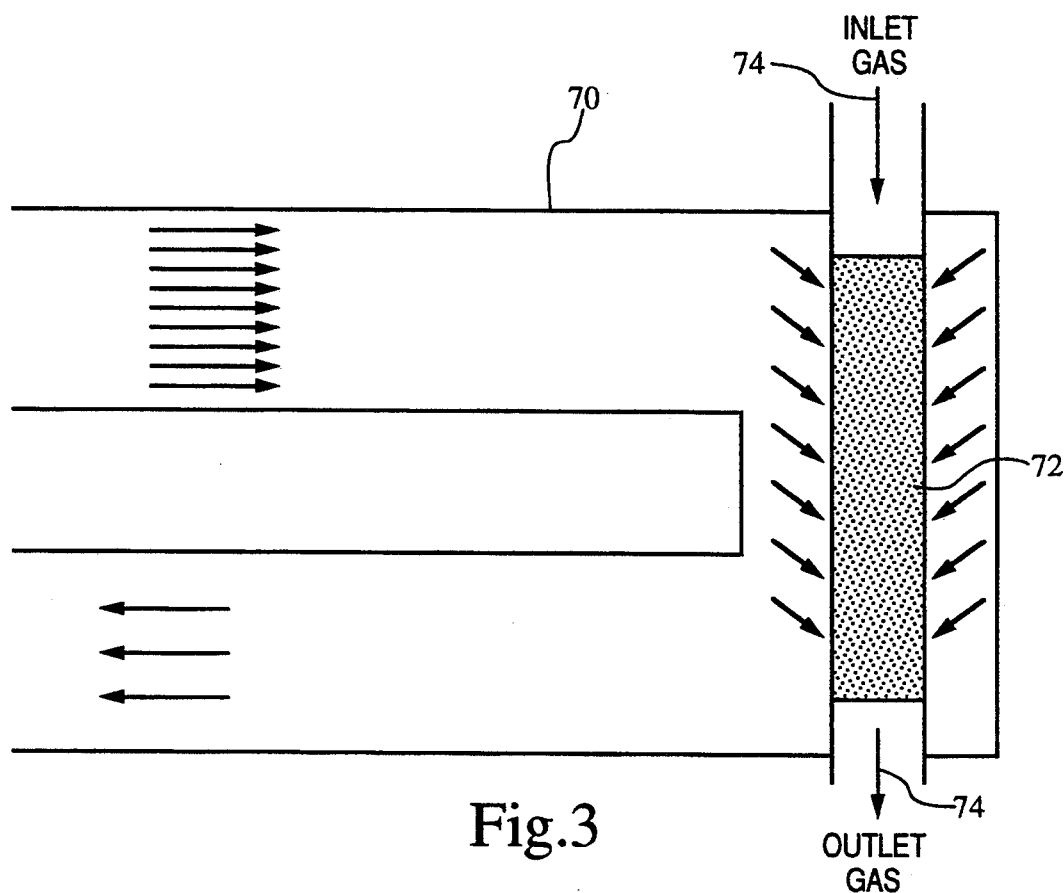
FIG. 3 shows a quartz tube reactor incorporated within a RF wave guide.

Radiofrequency heating is a versatile form of energy that is applicable to enhance rates of chemical reactions and therefore serves as a chemical catalyst. Particularly reactions that proceed by free-radical mechanisms are often catalyzed to higher rates because their initial equilibrium thermodynamics is unfavorable. A second class of catalyzed reactions are those whose reaction kinetics appear unfavorable at desirable temperature conditions.

Pyrolytic carbon is an excellent RF energy absorber because of its wide range of impurities having a polar molecular structure. Further it has good properties for the reaction of many gases, like $NO_x$, $SO_2$, and $N_2O$, providing a heterogeneous surface for the reaction as well as a source of carbon. When char, which contains a high percentage of carbon as shown in Table 1, is placed in a RF microwave field, its temperature rapidly increase setting up a large temperature gradient between the surface of the char and its surrounding bulk gas phase. If this gas phase comprises oxygen-containing molecules, the carbon will react and capture these oxygen atoms. Because the RF energy has heated the char surface, it acts as a catalyst for these heterogeneous reactions to proceed with a relatively low bulk gas temperature of below approximately 300° F.

Flue gases containing $NO_x$, $SO_2$, and $N_2O$ contact the RF energized carbon from char, carbon black, or other elemental carbon containing substance, the following decomposition chemical reactions potentially proceed:

$$C + 2NO \;(RF) \rightarrow CO_2 + N_2; \qquad (1)$$

$$C + NO \;(RF) \rightarrow (RF) \rightarrow CO + \tfrac{1}{2}N_2; \qquad (2)$$

$$C + SO_2 \;(RF) \rightarrow CO_2 + S; \qquad (3)$$

$$2C + SO_2 \;(RF) \rightarrow 2CO + S; \qquad (4)$$

$$C + N_2O \;(RF) \rightarrow CO + N_2; \qquad (5)$$

$$C + 2N_2O \;(RF) \rightarrow CO_2 + 2N_2; \qquad (6)$$

where (RF) $\rightarrow$ implies that RF microwave energy catalyzes the reaction to proceed in the direction indicated. Reactions (1), (3), (5) and (6) are exothermic and are favored at low temperatures. Reactions (2) and (4) are endothermic and occur without catalysis only at elevated temperatures. Further reaction (1) has a much higher heat of reaction than does reaction (3); therefore, NO is decomposed selectively in the presence of $SO_2$ by close control over the pyrolytic carbonbed temperature.

As noted in reactions (3) and (4), sulfur is the reaction product and not sulfuric acid. Yet because of the oxygen and water in the flue gas, the actual reaction mechanism is likely more complicated but the above reactions well represent the overall result.

TABLE 1

| Elemental Composition of Char | |
|---|---|
| Component | Weight % |
| Carbon | 77.1 |
| Hydrogen | 2.3 |
| Nitrogen | 1.2 |
| Sulfur | 0.4 |
| Oxygen | 10.1 |
| Ash | 8.9 |

TABLE 2

| Composition of Gas Produced from Char | |
|---|---|
| Component | volume % |
| $H_2$ | 59.2 |
| CO | 35.0 |
| $CH_4$ | 1.6 |
| $CO_2$ | 4.2 |

As shown in Table 1, the char contains a number of constituents beside carbon, and the RF microwave energy does decompose it. Typical components are:

$$\text{Char} \;(RF) \rightarrow H_2 + CO + C + Ash; \qquad (7)$$

where this occurs even at the low bulk gas temperatures. The nitrogen is not included herein since it often is employed as a sweep gas for such a reaction. Table 2 gives a typical gas analysis obtained by heating char with RF energy, and shows that for some reaction conditions carbon and hydrogen combine to form methane.

In a practical sense, the char is often present much in excess and is largely recycled after any adsorbed components are removed by further processing.

FIG. 1 shows the flow sheet of a system practicing the subject invention when applied to cleaning up a gas containing numerous oxides. Char 44 is stored and is enters as makeup 45 into the RF reactor 53. Additionally recirculated char also enters 47 although some is removed for char recovery 49 to eliminate ash and deposited sulfur. Any source of pyrolytic carbon containing a large surface area is potentially useable in place of char, for instance, mild gasification of coal produces such a material. Further mixtures of char and coal are potentially employable.

The gas containing oxides 61, such as $SO_2$, $NO_x$, or $N_2O$, is pressured adequately 60 and enters the RF reactor 53 and gives a moving or entrained bed reactor 57 as the gas and char flow together. Alternately a fluidized bed system is employable or even alternating fixed beds. The RF energy 55 is directed or applied into the reactor through wave guides 54; if the reactor chamber or cavity is physically small then tuning becomes useful; however, for industrial units the physical reactor size is normally adequate to absorb the RF energy by multiple reflections into the moving bed 57. The RF energy 55 catalyzes the appropriate gas oxide reactions with char producing elemental substances and oxides of carbon.

The moving or entrained bed 58 then leaves the reactor 53 and enters a cyclone 48 or other gas-solid separator. The cleaned gas 62 is exhausted while the char 47 is removed at the bottom of the cyclone 48 and is either recycled 46 or sent to the char recovery 49. The residence time of the char and the amount of RF energy generally govern the reaction rates.

EXAMPLE 1

To preliminary investigate the performance of the subject invention in carrying out reactions (1)-(7) a laboratory system was employed. A RF energy source at the standard microwave frequency of 2450 MHz and reasonable power was used with a special wave guide constructed substantially surrounding the reaction tube of ¼ to ⅜ I. D. Vycor, a material that was essentially transparent to microwave energy or RF-insulating. RF connections were made through mitre plates that allow needed access.

Load impedance matching was available and was often used with laboratory systems since the reaction chamber was physically small. In most industrial applications the reaction chamber and wave guides are large and reflected microwaves became eventually absorbed by the moving bed of char; thus, load impedance matching becomes unnecessary.

A co-pending application, U.S. patent application Ser. No. 07/828,380, entitled "Process for Activated Carbon Regeneration by Radiofrequency Catalysis", well described this test experimental apparatus and the specification of said application is hereby incorporated by reference.

Table 1 gave a typical composition of char obtained from mild gasification of subbituminous Western coal. Char from other sources would expect to possess a somewhat different composition, but behave in the subject invention in a similar expected manner. Applying RF energy to the char alone at approximately 400° F. using a nitrogen carrier gas produced a gas composition as shown in Table 2.

The sulfur ends up adsorbed on the char and was not released at this reaction temperature. The char can adsorb from approximately 5.9 to 10.1 weight percent $SO_2$ depending upon whether it was RF pre-treated; however, the catalyzed reaction by RF energy proceeds well whether or not the gases became preadsorbed onto the char or not.

Adsorption of NO was not as great as $SO_2$, but the actual form of the $NO_x$ was unknown; however, the temperature driving force between the char surface and the nitrogen oxides in the bulk stream was sufficient to cause chemical reactions (1) and (2) to easily proceed with excess char.

EXAMPLE 2

To investigate chemical reaction (1), the experiment apparatus of Example 1 was employed. Ten gram pyrolytic carbon black was inserted into the reaction tube and a gas containing 550 ppm NO and 99.95% $N_2$ was introduced into the top of the reactor. When the RF field was energized to approximately 350 watts, measurements of the NO level reduced to essentially zero. When the RF field was turned off, the measurements quickly returned to the previous input concentration. A further test using variable RF wattage showed that the maximum reaction conditions appeared at about 550 watts.

EXAMPLE 3

To investigate the effect of oxygen on the decomposition of NO, the apparatus of Example 1 was employed with 500 ppm of NO in nitrogen. Tests with oxygen content of 2.0, 3.4, and 5.0 percent were conducted where the flow of nitric oxide started about 14 minutes before any oxygen was introduced. The RF energy was constant at 550 watts. Without any oxygen present the NO concentration was essentially zero. Only in the 2 percent test did a measurable level of 40 ppm NO appear briefly before being reduced back to near zero.

EXAMPLE 4

A similar test as Example 2 was performed with a inlet composition of 1500 ppm $SO_2$ and 99.85% $N_2$. The reaction kinetics for this chemical reaction (3) were not as fast, indicating a longer needed reaction residence time, yet the $SO_2$ concentration was lowered to approximately 100 ppm. In practice this longer residence time proved unimportant since the char always was much in excess. Using variable RF wattage showed that the maximum reaction conditions appeared as before at approximately 550 watts.

EXAMPLE 5

A series of runs using the apparatus of Example 1 was employed to determine the effect of an adsorption and decomposition as separate steps for sulfur dioxide. The gas was 1.55 percent $SO_2$, in nitrogen and was adsorbed on a fixed bed of char. After adsorption a RF decomposition was employed at 425 watts power and 2450 MHz. The cycle was repeated a number of times until the adsorption of $SO_2$ became essentially constant at approximately 0.078 g $SO_2$ per g of char. Complete recovery of the elemental sulfur produced by the RF decomposition was obtained from the bleed gas stream by passing it through water. In essence a sulfur balance showed that essentially none of the sulfur remained within the char particles.

EXAMPLE 6

A test involving $N_2O$ reactions, chemical reactions (5) and (6), proceeded similar to Example 2. About 25 grams of char from mild coal gasification processing was employed in a quartz tube reactor with a helium sweep gas. The $N_2O$ was introduced and made up 50 percent by volume of the flowing gas which measured two standard cubic feet per hour. After RF energy at 550 watts applied for 16 minutes the composition of the exit gas, measured with a Hewlett-Packard 5890 Series II gas chromatograph, on a helium free basis was: $N_2$: 56.4%; CO: 30.8%; $CO_2$: 12.8%. Apparently both chemical reactions (5) and (6) were occurring at nearly equal rates; however, importantly no $N_2O$ was detected in the reaction exit gas as there was total decomposition of all nitrous oxide present.

EXAMPLE 7

The improve the flexibility of the RF char reactor a new reactor was designed as shown in FIGS. 2A, 2B, and 2C. The RF wave guide 70 has a built in geometrical-shaped metal reactor chamber or cavity 71, in this case aluminum, although other conducting wave guide metals such as brass, copper or stainless steel are employable, that employs a moving bed of reaction material 72, in this case char or other source of pyrolytic carbon. If a fixed bed configuration was employed, the reaction chamber 71 has a removable quartz plate 73, potentially perforated and alternatively made of other RF-insulating materials, at its bottom to hold material 72; however, for a full moving bed of reaction material 72 this plate 73 was removed. In this fixed bed configuration the reactor chamber 71 had provisions for inlet and outlet gas flow 74. The inside dimensions of the tube producing the reactor as shown in FIG. 2B, 1⅜ by 2 13/16 by 12 inches, was designed for use with RF energy of 2450 MHz; however, if a different frequency was employed, such as 915 MHz, the size was easily altered, in this case enlarged, to better match such frequency.

The concept of RF-insulating means that the material passes RF energy with a minimum of interaction; thus, said material does not heat up because of RF heating and in a sense acts as a thermal insulator. Because of its general inert nature, quartz is often a preferred RF-insulting material but others such as porcelain or glass are potentially employable if compatible with the reaction environment.

Power test run with this new reactor—wave guide operating as a fixed bed showed that approximately 90 percent of the input RF energy was absorbed by the char. In comparison it was estimated that the previous tests, Examples 1-6, utilized approximately less than about 10 percent of the RF energy supplied.

A set of tests made with this new reactor involved the devolatilization of approximately 128 grams of 50 weight percent char/coal mixture in the presence of nitrogen containing some oxygen. The RF power input was 480 watts. The item of measurement was the CO/$CO_2$ mole ratio produced, and with no oxygen in the sweep gas the measured result was approximately 20 after some 40 minutes of operation. With the 10 percent oxygen present the ratio dropped to approximately three at the same time period with no residual oxygen measured since, as expected, the RF energy catalyzed the complete reaction of oxides, in this case $O_2$. The interpretation was that much more CO, was being formed. The overall performance of the new reactor was excellent.

EXAMPLE 8

Figure 4:
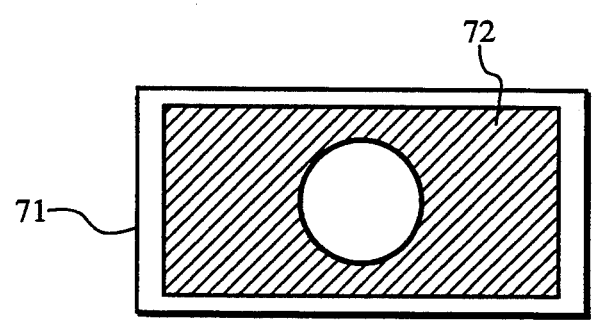
FIG. 4 shows a char reactor incorporated within a RF wave guide employing a hollow quartz tube.

A modification of the RF reactor of Example 7 was made to better utilize the RF energy available as shown in FIG. 3 and FIG. 4. In FIG. 3 a quartz, or other RF-insulating, tube is employed in the wave guide and the reaction char was placed within said tube. In repeating the tests of Example 7, again good RF efficiency of about 90 percent was obtained; however, the amount of char was quite small. To further improve the efficiency for a large amount of char, the configuration of FIG. 4 was employed where now the quartz tube is hollow or empty and the char surrounds it in the wave guide opening. This reduced the reflected RF energy further as well as not allowing a thick region of char where the center was effectively not exposed to sufficient Rf energy because of the large amount of RF absorption near the surface. Now the energy utilization approached 100 percent. Although as Example 7 indicated only a 12 inch portion of the wave guide was employed with the char as shown in FIG. 2A, a larger section up to 36 inches containing more char was potentially available with the full wave guide size as shown in FIG. 2C.

The foregoing description of the specific embodiments will so fully reveal the general nature of the invention that others can, by applying current knowledge, readily modify and/or adapt for various applications such specific embodiments without departing from the generic concept, and therefore such adaptations or modifications are intended to be comprehended within the meaning and range of equivalents of the disclosed embodiments. It is to be understood that the phraseology or terminology herein is for the purpose of description and not of limitation.

I claim:

1. A chemical reactor for radiofrequency catalysis comprising:
   a supported radiofrequency energy wave guide substantially surrounding a reaction bed comprising pyrolytic carbon;
   passing reactants through said bed; and
   applying to said wave guide tuned radiofrequency energy comprising the frequency rang of about 915 to 5000 MHz.

2. The reactor of claim 1 wherein said wave guide further comprises metal being selected from aluminum, copper, brass, stainless steel, and combinations thereof.

3. The reactor of claim 1 wherein said wave guide further comprises a RF-insulating reaction bed support beng selected from the materials comprising quartz, porcelain, glass, and combinations thereof.

4. The reactor of claim 3 wherein said support further comprises a hollow tube set longitudinally within said guide.

5. The reactor of claim 3 wherein said support further comprises a perforated plate set across said guide.

6. The reactor of claim 1 wherein said reactants further comprise gas oxides being selected from the group comprising $SO_2$, $NO_x$, $N_2O$, $O_2$, and combinations thereof.

7. The reactor of claim 1 wherein said bed further comprises being selected from a fixed bed, fluidized bed, moving bed, and combinations thereof.

8. A chemical reactor for radiofrequency catalysis comprising:

surrounding a moving reaction bed substantially with a radiofrequency energy metal wave guide wherein said metal is selected from aluminum, copper, brass, stainless steel, and combinations thereof, and wherein said bed comprises pyrolytic carbon being selected from char, carbon black, other RF-energized carbon, and combinations thereof;

passing through said bed reactants comprising gas oxides being selected from the group comprising $SO_2$, $NO_x$, $N_2O$, $O_2$, and combinations thereof; and applying to said wave guide tuned radiofrequency energy comprising the frequency range of about 915 to 5000 MHz.

* * * * *